United States Patent
Lee et al.

(10) Patent No.: US 6,325,218 B1
(45) Date of Patent: Dec. 4, 2001

(54) POLYION COMPLEX SEPARATION MEMBRANE WITH A DOUBLE STRUCTURE

(75) Inventors: Jung Min Lee; Choong Kyun Yeom; Chul Ung Kim; Beom Sik Kim; Kwang Joo Kim, all of Daejeon (KR)

(73) Assignee: Korea Research Institute of Chemical Technology, Daejon (KR)

( * ) Notice: Subject to any disclaimer, the term of this patent is extended or adjusted under 35 U.S.C. 154(b) by 0 days.

(21) Appl. No.: 09/486,238

(22) PCT Filed: Aug. 25, 1998

(86) PCT No.: PCT/KR98/00257

§ 371 Date: Feb. 24, 2000

§ 102(e) Date: Feb. 24, 2000

(87) PCT Pub. No.: WO99/10090

PCT Pub. Date: Mar. 4, 1999

(30) Foreign Application Priority Data

Aug. 25, 1997 (KR) .................................................. 97-40677

(51) Int. Cl.$^7$ ..................................................... B01D 29/05
(52) U.S. Cl. ............... 210/490; 210/500.29; 210/500.35; 210/500.41; 210/500.37; 210/500.43; 427/244; 427/245
(58) Field of Search ............................. 210/500.29, 490, 210/500.35, 500.41, 500.37, 500.38, 500.27, 640, 500.43; 427/244, 245

(56) References Cited

U.S. PATENT DOCUMENTS

| | | |
|---|---|---|
| 3,316,201 | 4/1967 | Hahn et al. . |
| 3,668,167 | 6/1972 | Ragazzini et al. . |
| 4,439,322 * | 3/1984 | Sonoda et al. . |
| 4,871,461 | 10/1989 | Karakane et al. . |
| 4,944,881 * | 7/1990 | Michizuki et al. . |
| 4,985,147 * | 1/1991 | Mochizuki et al. . |
| 5,393,432 * | 2/1995 | Tsyumoto et al. . |
| 5,646,205 * | 7/1997 | Lee et al. . |

FOREIGN PATENT DOCUMENTS

| | | |
|---|---|---|
| 40 26 154 | 2/1992 | (DE) . |
| WO 93/22040 | 11/1993 | (WO) . |
| WO 96/12554 | 5/1996 | (WO) . |

OTHER PUBLICATIONS

E. Immelman et al., "Poly(vinyl alcohol) Gel Sublayers for Reverse Osmosis Membranes. I. Insolubilization by Acid-Catalyzed Dehydration", Journal of Applied Polymer Science, vol. 50, pp. 1013–1034, (1993).

X. P. Zhao et al., "Pervaporation Separation of Ethanol–Water Mixtures Using Crosslinked Blended Polyacrylic Acid (PAA)–Nylon 66 Membranes", Journal of Applied Polymer Science, vol. 41, pp. 2133–2145, (1990).

D. Murphy et al., "An ATR–FTIR Study of Water in Cellulose Acetate Membranes Prepared by Phase Inversion", Journal of Membrane Science, vol. 106, pp. 245–257, (1995).

A. Kulkarni et al., "Flux Enhancement by Hydrophilization of Thin Film Composite Reverse Osmosis Membranes", Journal of Membrane Science, vol. 114, pp. 39–50, (1996).

* cited by examiner

*Primary Examiner*—Ana Fortuna
(74) *Attorney, Agent, or Firm*—Finnegan, Henderson, Farabow, Garrett & Dunner, L.L.P.

(57) ABSTRACT

This invention relates to a polyion complex separation membrane with a double structure, which is applicable in the separation process of a water-soluble mixture having ionic molecules or particles by means of reverse osmotic pressure for the purposes of recovering expensive ionic organic materials such as anionic emulsifiers from the waste water. More particularly, this invention relates to said membrane having anionic polymers, as substrate, which is immersed into a cationic polymer solution containing a multivalent ion cross-linking agent, by which a cross-linkage within the internal of the separation membrane is achieved, thereby forming an ion complex between ionic polymers of opposite ion at the surface of the separation membrane to yield a stable separation membrane of a double structure.

18 Claims, No Drawings

POLYION COMPLEX SEPARATION MEMBRANE WITH A DOUBLE STRUCTURE

BACKGROUND OF THE INVENTION

1. Field of the Invention

This invention relates to a polyion complex separation membrane with a double structure, which is applicable in the separation process of a water-soluble mixture having ionic molecules or particles by means of reverse osmotic pressure for the purposes of recovering expensive ionic organic materials such as anionic emulsifiers from the waste water. More particularly, this invention relates to said membrane having anionic polymers, as substrate, which is immersed into a cationic polymer solution containing a multivalent ion cross-linking agent, by which a cross-linkage within the internal of the separation membrane is achieved, thereby forming an ion complex between ionic polymers of opposite ion at the surface of the separation membrane to yield a stable separation membrane of a double structure.

2. Description of the Prior Art

In general, a mixture consisting of water and ionic organic compounds may be separated using the method of reverse osmotic pressure or low-pressure reverse osmotic pressure, in addition to the method of permeation evaporation.

Anionic emulsifier, one of the ionic organic materials, is utilized for the purposes of preparing water-soluble emulsions of polytetrafluoroethylene during emulsions polymerization. The water-soluble emulsion, so obtained from the said emulsions polymerization, is then concentrated. After filtration and separation of the solution with dissolved emulsifier, all of the filtrate solution undergoes waste-water treatment.

The methods of recovering emulsifiers in the filtrate solution include water evaporation (U.S. Pat. No. 3,316,201), vapor distillation, ion exchange by ion-exchange resin (U.S. Pat. No. 3,668,167), freezing, and solvent extraction. The simplest method is based on the water evaporation, as disclosed in U.S. Pat. No. 3,316,201, wherein the filtrate is concentrated to about 10% thereof, and after rejecting some of the impurities by separation of the layers with sulfuric acid, the filtrate is again distilled. However, water evaporation method has some disadvantages, for example, requires a lot of energy consumption and evaporation time is increased. The vapor distillation method involves expensive purification costs due to the usage of steam. The ion-exchange method requires a proper selection of ion exchange resins with complicated processes including adsorption and desorption.

By contrast, the use of membrane separation process by reverse osmotic pressure may save energy and other costs associated with the recovery process of emulsifier. The above separation method may be applicable to metals/inorganic ion solution, organic ion solution, and organic material solution.

As far as the substrate for the separation membrane are concerned, the strong hydrophilic polymers have been mainly used for the selective permeation of water. As for the separation of the solution containing ions, the ionic polymers or ion exchange resins have been mainly used as the substrate for the separation membrane so as to facilitate the separation between water and the solute by using the electrical attraction, e.g., electrical potential, between the ionic separation membrane and ionic molecules dissolved in the solution.

Further, in order to have water absorbed selectively in the separation membrane and then to have water so absorbed to permeate the separation membrane, the solubility of the separation membrane with respect to water must be excellent. More specifically, by raising the selectivity and permeability of the separation membrane to water, the separation performance of the separation membrane can be improved. The commonly used separation membrane substrates include polyvinyl alcohol (J. Appl. Polym. Sci., 50 (1993) 1013~1034), polyacrylic acid (J. Appl. Polym. Sci., 41 (1990) 2133~2145), cellulose-based polymer (J. Membr. Sci., 106 (1995) 245~257), and amide-based polymers (J. Membr. Sci., 114 (1995) 39~50). These polar polymers have good hydrophile with strong hydrogen bonds.

Meanwhile, as for the separation of the ionic solutes contained in a solution, by endowing the separation membrane with the same property as such ionic solutes, the molecules of the solute may be effectively excluded due to the electrostatic repulsion thereof. However, if the polarity of the polymer is increased, the hydrophile is also increased, resulting in the reduction of the mechanical property and stability of the separation membrane due to swelling induced by water. Such drawbacks may be prevented by the method of a chemical modification or polymer mixture designed either to introduce a cross-linking structure to the separation membrane or a hydrophobic group to the backbone or side chain of the polymer. In such case, the stability of the separation membrane is enhanced at the expense of the deterioration of the separation performance of the separation membrane due to the reduction in the hydrophile.

To minimize the reduction in the hydrophile and provide better stability to the separation membrane, the method has been devised to form ion cross-links within the internal of the polymer by using multivalent ion-based inorganic ions or metals ions as cross-linking agent to the polymers, such as polyvinyl alcohol, polyacrylic acid, and polysaccharide. However, such method needs to be further improved in that when such cross-linked separation membrane is exposed to the flow of supply solution for a prolonged period of time, the cross-linkage ions are washed way by the solution, thus deteriorating the stability of the separation membrane with lapse of time, or the pH of the solution is adversely affected thereby.

SUMMARY OF THE INVENTION

In light of the aforementioned problems, the objective of the invention herein is to provide a polyion complex separation membrane with a double structure, which is applicable in the separation process of a water-soluble mixture having ionic molecules or particles by means of reverse osmotic pressure for the purposes of recovering expensive ionic organic materials such as anionic emulsifiers from the waste water. As for the substrate for the membrane for separating anionic emulsifiers from the solution via reverse osmotic pressure, the anionic polymer membrane is immersed in a cationic polymer solution containing a multivalent ion cross-linking agent, by which a cross-linkage within the internal of the separation membrane is formed, thereby yielding a stable separation membrane of a double structure.

DETAILED DESCRIPTION OF THE INVENTION

This invention relates to a polyion complex separation membrane with a double structure designed to separate anionic-based solutes from the solution containing anionic-based solutes, wherein a cation polymer form an ion complex on the surface of the anionic polymer membrane and at the same time, an ionic cross-linkage is formed within the internal of said polymer membrane by a multivalent ion-based cross-linking agent.

This invention is explained in more detail as set forth hereunder.

According to this invention, the polyion complex separation membrane with a double structure is prepared in such a manner that the surface of the ionic polymer membrane is in contact with the polymer solution having opposite ion as against said surface of the separation membrane, which forms the ion complex between said cations and anions, and at the same time, an ionic cross-linkage is formed by a multivalent ion-based cross-linking agent which is present in the separation membrane by application.

The polyion complex separation membrane according to this invention is insoluble in water or organic solvents due to the ion cross-links therein. Also, said complex of cations and anions is formed at the surface of the separation membrane to protect the internal of the separation membrane. As such, the ionic cross-linkages formed within the internal of the separation membrane is not washed away by the mixture solution supplied during the separation process, which in turn results in durability and enhanced stability for a prolonged period of time.

The main components necessary for the prepare of the separation membrane include a multivalent ion cross-linking agent, an ionic polymer used as the substrate, and a polymer with the opposite ion of said ionic polymer. In particular, an anionic polymer is adequate for the prepare of the separation membrane. The multivalent ion inorganic salt or metal salt may provide an ionic cross-linkage within the internal of the separation membrane. Further, a cationic polymer may form an ionic complex on the surface of the polymer membrane.

In addition, this invention relates to a polyion complex separation membrane with a double structure whose internal is cross-linked by a cross-linking agent using the cellulose-based anion polymer or acrylic acid-based polymer as anion polymer, together with the cellulose-based cationic polymer or polypyridine-based polymer as cationic polymer.

The invention is explained based on the preparing process in more detail as set forth hereunder.

In general, the separation membrane designed to separate ionic organic solutes from the solution containing ionic organic solutes must have the same ion as said ionic solutes since ionic solutes are separated using the principle of electrostatic repulsive force. According to this invention, the substrate used for the separation membrane should preferably be relatively reasonable-priced anionic polymers with high permeation and selective capacity to water. To this end, it is preferable to use cellulose-based or polyacrylic acid-based anion polymers as substrate of the separation membrane. In addition, the polymers as the substrate for the formation of said ion complex include cellulose-based cationic polymers or polypyridine-based cationic polymers with relatively high cationic charge density.

The cellulose-based anion polymers may be selected from the group consisting of sodium alginate, potassium alginate and lithium alginate. Further, sodium acrylate may be used for the polyacrylic acid-based anion polymer. In addition to the above mentioned anion polymers, any one of the cellulose-based or polyacrylic acid-based anion polymer may be used, with the same effects.

In addition, chitosan may be used as the cellulose-based cationic polymer, and the polymer salts such as polypyridine salt may be also used as polypyridine-based cationic polymers. Based on the ion complex reaction among cationic polymers, any one of the cellulose-based or polypyridine acid-based anion polymers may be used with the same effects, in addition to the above mentioned cationic polymers.

The content of the anionic polymers used for the substrate of this invention is in the range of 0.1~10 wt %, preferably 0.5~5 wt % in proportion to the casting solution. If the amount is less than 0.1 wt %, the casting solution cannot be applied due to its extremely low concentration. If it exceeds 10 wt % or more, the coating cannot be performed due to high viscosity of the casting solution.

The anionic polymer as substrate, is dissolved in the water and then, the aqueous solution is applied onto the supporter in the form of a film using a casting knife. The film is immersed in a solution consisting of anionic polymers having a multivalent ion cross-linking agent and cationic polymers for 5~60 minutes. During such reaction, an ionic cross-linkage and ionic complex are formed, followed by the generation of the insoluble membrane.

A cationic polymer is added to the anionic polymer for the formation of the ionic complex. Thus, the content of the cationic polymers is in the range of 0.05~1 wt %, preferably 0.1~0.3 wt % in proportion to the immersion solution containing cationic polymers. If the amount is less than 0.05 wt %, an ionic complex cannot be sufficiently formed due to the extremely low concentration of the polymers within the solution. However, if it exceeds 1 wt %, both the ionic complex and cationic layers are formed on the surface of the separation membrane.

Further, the multivalent ion cross-linking agents include multivalent ion-based inorganic salts or metal salts. In particular, the multivalent ion-based inorganic salt may be selected from the group consisting of calcium chloride, aluminum nitrate, aluminum sulfate, and cupric sulfate.

As for the amount of the multivalent ion cross-linking agent used for the invention, it is in the range of 0.1~5 wt %, preferably 0.5~2 wt % to the immersion solution containing the same. If the amount of the cross-linking agent is less than 0.1 wt %, the insufficient cross-linkage may result due to the extremely low concentration of the cross-linking agent in the immersion solution. If it exceeds 5 wt %, an unnecessarily excessive consumption of the cross-linking agent results therefrom.

If the insoluble membrane, so prepared, is separated from the supporter and dried in air, the highly stable separation membrane with respect to water is produced.

Further, the polyion complex separation membrane of the invention herein is prepared via the cross-linkage reaction of the anionic polymers and ion complex reaction.

More specifically, the separation membrane with the same structure as above may be prepared in such a manner that the anionic polymer used as substrate of the invention is formed into cross-linkage via a multivalent ion cross-linking agent and immersed in a solution containing cationic polymers for the ionic ion complex reaction. In addition, based on other methods using the same principle of this invention, a polyion complex separation membrane with a double structure may be prepared.

A single use of the polyion complex separation membrane having a thickness of 5~50 μm may be available. For the composite separation membrane, said membrane can be coated onto the supporter therein.

In case where the separation membrane, so prepared, is intended for a single use, the thickness of the separation membranes is of great significance. If the thickness is less than 5 μm, the membrane is easily torn due to a weak mechanical strength. If it exceeds 50 μm, the permeability rate is unduly reduced.

Further, the process for preparing the composite separation membrane is provided as follows: The polysulfone or polyether ultrafiltration membrane is immersed in a 1~10% sulfuric acid solution for 05.~5 hours to activate the portion of the surface of the separation membrane, after which is washed with distilled water. Then, such membrane is immersed for 1~5 hours with an anionic polymer solution of 0.01~0.1 wt %, thereby enhancing the adhesiveness and wettability with respect to the coating solution. The membrane is placed into the anionic polymer solution, as substrate, of 0.1~2 wt % for about 1~60 minutes and taken out. By vertically placing the separation membrane for 1~60 minutes, the remainder of the coating solution on the surface of the separation membrane is rejected. The membrane is further immersed in a solution containing an ionic cross-linking agent and cationic polymers for 1~60 minutes, and the coated membrane is coagulated and dried in air to yield a composite separation membrane.

The supporter used for such composite separation membrane may be selected from the polymers, in the forms of plain membrane and hollow membrane, consisting of polysulfone, polyetherimide, and polyacrylonitrile.

The following examples illustrate various aspects of the invention herein but are not to be construed to limit the claims in any manner whatsoever.

EXAMPLE 1

Sodium alginate (10 g) was dissolved in water (500 ml) to yield a solution of 2% sodium alginate. This solution was coated to a glass plate with a thickness of 250 μm, using a casting knife, and dried at room temperature. The alginic acid-based membrane, so dried, was immersed for 10 minutes in an aqueous solution of a cross-linking agent containing calcium chloride (15 g) dissolved in water (1,000 ml), washed with distilled water several times, and finally dried in air.

Then, the dried material was immersed for 5 minutes with an aqueous solution of chitosan containing 0.1 wt % of chitosan, 0.5 wt % of acetic acid, 1.5 wt % of calcium chloride and 0.05 N sodium hydroxide. The membrane, so obtained, was washed with distilled water several times and dried to yield a polyion complex separation membrane with a double structure.

EXAMPLE 2

The polyion complex separation membrane with a double structure was prepared in the same procedure as described in the Example 1, except that the alginic acid membrane was immediately immersed in a chitosan solution for 5 minutes, not immersed in calcium chloride solution.

EXAMPLES 3~6

Each of polyion complex separation membrane with a double structure was prepared in the same procedure as described in the Example 2 but with the different immersion time intervals of chitosan solution at 10, 20, 30, and 60 minutes.

EXPERIMENTAL EXAMPLE 1

Based on the polyion complex separation membrane with a double structure, so prepared from the Examples 1~6, the membrane separation tests were made on a solution containing 1,000 ppm of anionic emulsifier by reverse osmotic pressure in the following continuous supply process condition (operation pressure of 40 Pa, and operation temperature of 25° C.). The test results are shown in the following table 1.

TABLE 1

| Example | Immersion time (min.) | Permeation rate (kg/m$^2$hr) | Rejection (%) |
| --- | --- | --- | --- |
| 1 | 5 | 10.1 | 99.2 |
| 2 | 5 | 10.4 | 99.4 |
| 3 | 10 | 10.6 | 99.1 |
| 4 | 20 | 9.4 | 99.2 |
| 5 | 30 | 9.6 | 99.5 |
| 6 | 60 | 9.2 | 99.4 |

As noted in the above table 1, there were no significant differences in the membranes prepared from the Examples 1~2. This suggests that the intermediate step in the Example 1 (i.e., placing the sodium alginate membrane, so coated and dried, in a cross-linking agent solution) may be omitted. In addition, when the immersion time was increased, the permeation rate was somewhat reduce but with no significant changes in the rejection. The above results indicate that the cross-linking reaction and ionic complex reaction were carried out within 5 minutes.

EXAMPLES 7~9

Each of the polyion complex separation membranes with a double structure was prepared in the same procedure as described in the Example 2 but with the different concentrations of chitosan solution at 0.3, 0.5 and 0.8%.

EXPERIMENTAL EXAMPLE 2

The polyion complex separation membranes with a double structure, so prepared from the Example 7~9, were tested in the same procedure as described in the Experimental example 1. The results of the separation by reverse osmotic pressure are shown in the following table 2.

TABLE 2

| Example | Conc. of chitosan (%) | Permeation rate (kg/m$^2$hr) | Rejection (%) |
| --- | --- | --- | --- |
| 7 | 0.3 | 9.5 | 98.3 |
| 8 | 0.5 | 7.2 | 87.7 |
| 9 | 0.8 | 4.8 | 69.0 |

As noted in the above table 2, the higher the chitosan concentration in the chitosan solution, the more the reduction in the permeation rate and rejection. This may be explained as follows: If the chitosan concentration is increased, pure chitosan membranes are formed in addition to the ion complex layers, the thickness of which is increased, with the result of affecting the permeation-separating character therein. More specifically, if the concentration of chitosan in chitosan solution is increased, the more cationic character is manifested on the membrane surface. During the membrane separation process, the larger quantity of anion emulsifiers are adsorbed onto the membrane surface due to electrostatic attraction, thus causing a fouling problem on the membrane surface.

EXAMPLES 10~12

Each of the polyion complex separation membrane with a double structure was prepared in the same procedure as described in the Example 2, using aluminum nitrate, aluminum sulfate, or cupric sulfate instead of calcium chloride contained in the respective solutions of cross-linking agent and chitosan.

EXPERIMENTAL EXAMPLE 3

The polyion complex separation membranes with a double structure, so prepared from the Examples 10~12, were tested in the same procedure as described in the Experimental example 1. The results of the membrane separation by reverse osmotic pressure are shown in the following table 3.

TABLE 3

| Example | Cross-linking agent | Permeation rate (kg/m$^2$hr) | Rejection (%) |
|---|---|---|---|
| 10 | Aluminum nitrate | 10.2 | 99.0 |
| 11 | Aluminum sulfate | 9.5 | 99.2 |
| 12 | Cupric sulfate | 9.7 | 99.6 |

EXAMPLES 13~16

Each of the polyion complex separation membranes with a double structure was prepared in the same manner as described in the Example 2, except that potassium alginate, lithium alginate or sodium acrylate was used as the cellulose-based anion polymers instead of sodium alginate while using polypyridine as cellulose cationic polymers instead of chitosan.

EXPERIMENTAL EXAMPLE 4

The polyion complex separation membranes with a double structure, so prepared from the comparative Examples 13~16, were tested in the same procedure as described in the Experimental Example 1. The results of membranes separation by reverse osmotic pressure are shown in the following table 4.

TABLE 4

| Example | Anionic polymer | Cationic polymer | Permeation rate (kg/m$^2$hr) | Rejection (%) |
|---|---|---|---|---|
| 13 | Lithium alginate | Chitosan | 9.5 | 99.3 |
| 14 | Potassium alginate | Chitosan | 10.5 | 99.1 |
| 15 | Sodium | Chitosan | 8.9 | 99.1 |
| 16 | Sodium alginate | Polyvinyl-pyridine | 10.2 | 99.2 |

COMPARATIVE EXAMPLE 1

The reaction was carried out in the same manner as described in the Example 1, except that the separation membranes were prepared with the cross-linkage alginic acid membranes without immersed the chitosan solution.

COMPARATIVE EXAMPLE 2

Chitosan was dissolved in water to yield a coating solution use containing 2% chitosan. The solution was coated onto the glass plate of 250 μm in thickness, using a casting knife, and dried at room temperature. The dried chitosan membrane was immersed in sulfuric acid solution (sulfuric acid: 2 wt %, water: 49 wt %, and ethanol: 49 wt %) for 10 minutes, washed with distilled water several times, and dried in air to yield the separation membrane herein.

EXPERIMENTAL EXAMPLE 5

The separation membranes, so prepared from the Comparative examples 1~2, were washed with distilled water several times. In the same procedure as described in the Experimental example 1, the reaction was carried out. The results of reverse osmotic pressure permeation test are shown in the following table 5.

TABLE 5

| | Operating time | | | |
|---|---|---|---|---|
| Category | 3 hrs. | 10 hrs. | 30 hrs. | 60 hrs. |
| Comp. Example 1 | 10.1/99.0 | 11.5/97.9 | 19.1/90.3 | 44.7/82.8 |
| Comp. example 2 | 4.3/65.0 | 2.1/43.3 | 1.9/40.5 | 1.8/40.3 |

Note: Each figure on separation character is calculated by permeation rate (kg/m$^2$hr)/rejection (%).

As noted in the Comparative example 1, the reason for the increase in the permeation rate of the cross-linkage sodium alginate membrane and the accompanying reduction in the rejection based on the operation time was that the cross-linking agent was washed away by the supply solution, which in turn dissolved the membrane surface into the supply solution based on the operation time. By contrast, the Comparative example 2 showed that both the permeation rate and rejection were reduced based on the operation time. This may be explained by the fact that the anionic emulsifier molecules were adsorbed onto the surface of the chitosan membrane comprising cationic polymers due to the electrostatic attraction. Consequently, the polarization of the concentration and fouling on the membrane surface occurred, which in turn was responsible for the reduction in the membrane performance.

In the case of the separation of the solution of anionic emulsifier, the polyion complex separation membrane with a double structure under said invention has superior separation performance and stability of the membrane substrate. In addition, it is expected that the remarkable membrane separation performance of this invention may contribute to the effective rejection and recovery of the monovalent metal ions as well as other anionic organic materials since the separation device of these mixtures is the same as those used in the separation of the anionic emulsifier solution in the above Examples.

The polyion complex separation membrane with a double structure prepared from a preparing process under this invention has several advantages in that a) the ionic cross-linkage formed within the separation membrane is not washed away by the mixing solution supplied during the process, whereby maintaining the durability and enhanced stability for a prolonged period of time, b) an the water-soluble mixture containing ionic molecules or particles may be effectively applied to the membrane separation process by reverse osmotic pressure, i.e., to the recovery process of the expensive ionic compounds such as anionic emulsifier, and c) the discharge of waste material is prevented.

What is claimed is:

1. A polyion complex separation membrane with a double structure for separating anionic-based organic solutes from a solution containing the same wherein
   a cationic polymer is provided on a surface of an anionic polymer membrane substrate to form an ionic complex on the surface of said substrate, and
   an ionic cross-linkage is provided within said anionic polymer membrane substrate with a multivalent ion-based cross-linking agent.

2. The polyion complex separation membrane with a double structure according to claim 1, wherein said anionic polymer is selected from the group consisting of sodium alginate, lithium alginate, potassium alginate, and sodium acrylate.

3. The polyion complex separation membrane with a double structure according to claim 1 or 2, wherein said anionic polymer is provided from a casting solution comprising said anionic polymer in an amount ranging from 0.5~5 wt %.

4. The polyion complex separation membrane with a double structure according to claim 1, wherein said cationic polymer is selected from the group consisting of chitosan and polypyridine.

5. The polyion complex separation membrane with a double structure according to claim 1 or 4, wherein said cationic polymer is provided from an immersion solution comprising said cationic polymer in an amount ranging from 0.1~0.3 wt %.

6. The polyion complex separation membrane with a double structure according to claim 1, wherein said multivalent ion cross-linking agent is selected from the group consisting of calcium chloride, aluminum nitrate, aluminum sulfate, and cupric sulfate.

7. The polyion complex separation membrane with a double structure according to claim 1 or 6, wherein said multivalent ion cross-linking agent is provided from an immersion solution comprising said multivalent ion cross-linking agent in an amount ranging from 0.5~2 wt %.

8. The polyion complex separation membrane with a double structure according to claim 1, wherein said separation membrane is a homogenous plain membrane formed only by a polyion complex membrane having a double structure, or a composite membrane formed by a polyion complex membrane having a double structure on a supporter.

9. A process of preparing the polyion complex separation membrane with a double structure for separating anionic-based organic solutes from a solution containing the anionic-based solutes, which cocomprising:

coating an anionic polymer as a film onto a supporter to form a membrane substrate on said supporter;

immersing said anionic polymer membrane substrate in a cross-linking agent solution comprising a multivalent ion cross-linking agent, to form a homogeneous cross-linkage within said anionic polymer membrane substrate; and immersing said anionic polymer membrane substrate in a solution comprising a cationic polymer, to form an ionic complex between the anionic and cationic polymers on a surface of said anionic polymer membrane substrate.

10. The process of preparing the polyion complex separation with a double structure according to claim 9, wherein said supporter is a porous supporter comprising at least one polymer selected from the group consisting of polysulfone, polyetherimide, and polyacrylonitrile polymers.

11. The process of preparing the polyion complex separation membrane with a double structure according to claim 9, wherein said supporter is a plain membrane or hollow membrane.

12. The process of preparing the polyion complex separation membrane with a double structure according to claim 9, wherein said supporter is a glass supporter.

13. A process of preparing a polyion complex separation membrane with a double structure for separating anionic-based organic solutes from a solution containing the anionic-based solutes, comprising:

coating an anionic polymer as a film onto a supporter, to form an anionic polymer membrane; and immersing, without drying, said anionic polymer membrane into an immersion solution comprising a cationic polymer and a multivalent ion cross-linking agent, to simultaneously form an ionic complex between the anionic and cationic polymers on a surface of said anionic polymer membrane, and a multivalent ion cross-linkage within the anionic polymer membrane.

14. The process of preparing the polyion complex separation membrane with a double structure according to claim 13, wherein said supporter is a porous supporter comprising at least one polymer selected from the group consisting of polysulfone, polyetherimide, and polyacrylonitrile polymers.

15. The process of preparing the polyion complex separation membrane with a double structure according to claim 13, wherein said supporter is a plain membrane or hollow membrane.

16. The process of preparing the polyion complex separation membrane with a double structure according to claim 13, wherein said supporter is a glass supporter.

17. A polyion complex separation membrane with a double-layered structure, comprising:

(a) a membrane layer comprising an anionic polymer, wherein said anionic polymer is ionically cross-linked with a multivalent ion-based cross-linking agent; and (b) a cationic polymer on a surface of said anionic polymer, forming a polyion complex comprising said anionic polymer and said cationic polymer.

18. A process of preparing a polyion complex separation membrane with a double-layered structure, comprising:

(a) coating a substrate on a support, wherein said substrate is a film and comprises an anionic polymer;

(b) immersing, without drying, said substrate into an immersion solution comprising a cationic polymer and a multivalent ion based cross-linking agent; and (c) simultaneously forming (1) a surface layer comprising a polyion-complex, said polyion complex comprising said cationic polymer and said anionic polymer, and (2) an ionic cross-linkage within said anionic polymer, said ionic cross-linkage comprising a multivalent ion-based cross-linking agent.

* * * * *

UNITED STATES PATENT AND TRADEMARK OFFICE
CERTIFICATE OF CORRECTION

PATENT NO. : 6,325,218 B1
DATED : December 4, 2001
INVENTOR(S) : Jung Min Lee et al.

Page 1 of 1

It is certified that error appears in the above-identified patent and that said Letters Patent is hereby corrected as shown below:

<u>Column 8, claim 1,</u>
Line 61, "same wherein" should read -- same, wherein --.

<u>Column 9, claim 9,</u>
Line 40, "which cocomprising" should read -- comprising --.

<u>Column 10, claim 18,</u>
Line 49, "ion based" should read -- ion-based --.
Line 51, "polyion complex" should read -- polyion-complex --.

Signed and Sealed this

Twenty-sixth Day of March, 2002

*Attest:*

JAMES E. ROGAN
*Attesting Officer*     *Director of the United States Patent and Trademark Office*